United States Patent [19]
Gresens

[11] Patent Number: 4,602,407
[45] Date of Patent: Jul. 29, 1986

[54] CONVEYOR CHAIN FOR TENSIONING MACHINE

[75] Inventor: Harry Gresens, Benningen, Fed. Rep. of Germany

[73] Assignee: Bruckner Trockentechnik GmbH & Co. KG., Leonberg, Fed. Rep. of Germany

[21] Appl. No.: 639,815

[22] Filed: Aug. 13, 1984

[30] Foreign Application Priority Data

Sep. 20, 1983 [DE] Fed. Rep. of Germany ....... 3333938

[51] Int. Cl.$^4$ ............................................. D06C 3/02
[52] U.S. Cl. ........................................ 26/89; 384/461
[58] Field of Search ............... 26/89, 95, 93; 384/461, 384/474, 475

[56] References Cited

U.S. PATENT DOCUMENTS

| 2,337,335 | 12/1943 | Maier | 384/474 |
| 2,703,020 | 3/1955 | Fish | 26/93 |
| 3,500,515 | 3/1970 | Cunningham et al. | 26/93 |

FOREIGN PATENT DOCUMENTS

| 1124776 | 7/1956 | France | 26/95 |
| 47-20269 | 9/1972 | Japan | 26/93 |
| 240934 | 10/1925 | United Kingdom | 26/89 |
| 425381 | 3/1935 | United Kingdom | 26/89 |

OTHER PUBLICATIONS

Bruckner Information T30E, Bruckner-Trockentechnic KG, Benzstrasse 8-10, 7250 Leonberg, Germany.

Primary Examiner—Robert R. Mackey
Attorney, Agent, or Firm—Learman & McCulloch

[57] ABSTRACT

A support for a textile tensioning machine conveyor chain and wherein a first needle bearing assembly is arranged between the joint bolt and a bushing and a second needle bearing assembly is arranged between the bushing and a protective roller. Such a chain support can be provided with permanent lubrication even at a high conveyor speed and thus requires little maintenance.

7 Claims, 1 Drawing Figure

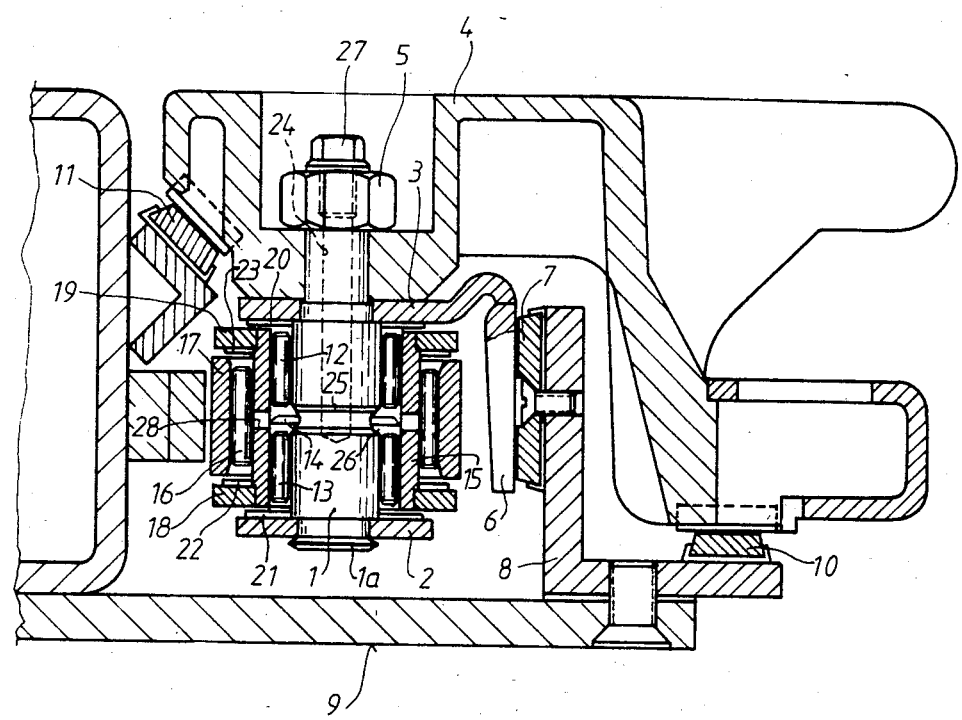

CONVEYOR CHAIN FOR TENSIONING MACHINE

The invention relates to a support for the conveyor chain of a textile tensioning machine.

BACKGROUND OF THE INVENTION

In previously known supports for conveyor chains of textile tensioning machines, bushings are fixed directly to joint bolts carried by inner fishplates and protective rollers are provided directly on the bushings. In operation, this type of construction requires continuous lubrication of the sliding surfaces between the bushings and the joint bolts and between the protective rollers and the bushings. This necessity for essential lubrication results in the disadvantage that considerable maintenance costs are incurred.

The object of the invention is to avoid this disadvantage and provide a conveyor chain support that, on the one hand can be operated at a high speed, but on the other hand requires little maintenance.

SUMMARY OF THE INVENTION

The construction according to the invention includes a joint bolt encircled by a pair of axially spaced sets of needle bearings, and such bearings in turn are encircled by a bushing. Interposed between the bushing and an outer protective roller is a further needle bearing assembly.

The use of needle bearings between the joint bolt and the bushing and between the bushing and the protective roller results in a practically maintenance-free conveyor chain, since the lubricant (generally grease) is not subjected to wear in practice because of the limited movement of the needle bearings. In a conveyor chain of the type with which the invention is adapted for use, the bushings or protective rollers merely have to rotate through a small angle in the region of the chain guide wheel (thus with 20 teeth on the chain guide wheel, the angular movement would be 18°). If the needle bearings have a sufficiently high load capacity then further lubrication of the conveyor chain according to the invention is not necessary in practice; on the contrary, the conveyor chain is provided with a permanent lubrication and therefore requires very little maintenance.

THE DRAWING

A preferred embodiment of the invention is disclosed in the following description and in the accompanying drawing which is a vertical sectional view through a chain support at one side of a textile tensioning machine.

THE PREFERRED EMBODIMENT

A conveyor chain for a textile tensioning machine conventionally includes a number of joint bolts 1 spaced longitudinally along the chain, each of which is fixed to lower outer fishplates 2 and upper fishplates 3. The lower outer fishplates 2 are riveted to the associated joint bolt 1 over the joint bolt head 1a, whilst the upper outer fishplates 3, together with a screw plate body 4, are screwed to the joint bolt 1 with the aid of a nut 5.

In the illustrated embodiment, the upper outer fishplate 3 has a slide element 6 supported on a stationary slide bar 7 which is made from carbon and accommodates the transverse tension imposed by a web of textile material. The slide bar 7 is held by a mounting angle 8 on the stationary chain guide rail frame 9.

A further slide bar 10 supports the screw plate body 4 horizontally in the region of the screw plate (which is not shown in detail), whilst a third slide bar 11 provides an inclined support on the other side of the joint bolt 1.

On the joint bolt 1, two sets of needle bearing assemblies 12, 13 are axially spaced one above the other and separated from each other by a spacer washer 14. A bushing 15 encircles the needle bearings 12, 13 and in its turn forms the inner ring of a further needle bearing assembly 16, the outer ring of which is formed by a protective roller 17.

The bushing 15 is fixed to a lower inner fishplate 18 and an upper inner fishplate 19.

Foil bearings 20, 21 or 22, 23 are provided between the axial ends of the needle bearings 12, 13 and the outer fishplates 2, 3 and between the axial ends of the needle bearing 16 and the inner fishplates 18, 19.

In the joint bolt 1, there is a axial bore 24 which communicates via radial bores 25 with an annular groove 26. The axial bore 24, which is closed by a screw 27, forms a lubricant reservoir and the radial bores 25 and the annular groove 26 form a lubricant channel for the sets of needle bearings 12, 13.

Radially extending lubrication channels 28 are provided in the bushing 15 at a level between the sets of needle bearings 12, 13 and lubricant passes through these lubrication channels 28 out of the annular groove 26 to the outer needle bearing 16.

In operation of the illustrated conveyor chain, the transverse tensional forces produced by a length of material are transmitted via the screw plate body 4 and the slide element 6 to the stationary slide bar 7 and absorbed by the latter. The slide bar 7 which is made from carbon requires no lubrication, just like the further slide bars 10 and 11.

In the region where the chain changes its direction, there is a relative rotating motion between the outer fishplates 2, 3 (and the joint bolt 1 connected thereto) on the one hand and the inner fishplates 18, 19 (and the bushing 15 connected thereto) on the other hand or between the bushing 15 and the protective roller 17. However, since this is only a small rotating motion, even at a very high conveying speed of the chain (for example 300 m/min), this results in only very limited wear on the lubrication of the needle bearings.

I claim:

1. An endless chain construction for a textile tensioning machine having a frame on which a stationary slide bar is mounted, said chain construction comprising outer fishplates arranged in pairs and fixed to a joint bolt, inner fish plates arranged in pairs and fixed to a circular bushing encircling and radially spaced from the joint bolt, a protective roller rotatably encircling and spaced radially outwardly from said bushing, a slide element carried by one of the outer fishplates and extending transversely thereof for sliding engagement with said stationary slide bar to absorb transverse tension, a first circular needle bearing assembly occupying the space between the joint bolt and the bushing, a second circular needle bearing assembly occupying the space between the bushing and the protective roller, said first and second needle bearing assemblies being concentric with one another, an axial bore in said joint bolt forming a lubricant reservoir, and lubricant channel means in communication with said reservoir and with both of said bearing assemblies for supplying both of said bearing assemblies with lubricant from said reservoir.

2. The construction according to claim 1 wherein said first needle bearing assembly comprises two sets of needle bearings spaced from each other axially of said joint bolt.

3. The construction according to claim 2 wherein said lubricant channel means includes a radially extending opening in said bushing at a level between said sets of needle bearings.

4. The construction according to claim 1 wherein said lubricant channel means includes a radial opening in said joint bolt and a radial opening in said bushing at a level between its ends.

5. The construction according to claim 4 wherein said radial opening in said joint bolt is at substantially the same level as the level of the radial opening in said bushing.

6. The construction according to claim 1 wherein said lubricant channel means comprises an annular groove in said joint bolt, a radial opening through said joint bolt in communication with said reservoir, and a radial opening through said bushing at a level between its ends.

7. The construction according to claim 6 wherein said annular groove and both of said radial openings are at substantially the same level.

* * * * *